United States Patent
Sano et al.

(10) Patent No.: US 9,045,811 B2
(45) Date of Patent: Jun. 2, 2015

(54) PROCESS OF LEACHING GOLD

(75) Inventors: Masaki Sano, Hitachi (JP); Yoshifumi Abe, Hitachi (JP); Kazuhiro Hatano, Hitachi (JP); Koji Katsukawa, Hitachi (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 33 days.

(21) Appl. No.: 13/482,421

(22) Filed: May 29, 2012

(65) Prior Publication Data

US 2012/0304828 A1 Dec. 6, 2012

(30) Foreign Application Priority Data

May 30, 2011 (JP) .................................. 2011-121104

(51) Int. Cl.
| | |
|---|---|
| C22B 11/00 | (2006.01) |
| C22B 3/04 | (2006.01) |
| C22B 3/00 | (2006.01) |
| C22B 3/12 | (2006.01) |
| B03D 1/02 | (2006.01) |

(52) U.S. Cl.
CPC ................. C22B 11/042 (2013.01); C22B 3/12 (2013.01); B03D 1/02 (2013.01); C22B 11/04 (2013.01)

(58) Field of Classification Search
CPC ........ C22B 3/12; C22B 11/04; C22B 11/042; B03D 1/02
USPC ........................................................... 75/744
See application file for complete search history.

(56) References Cited

U.S. PATENT DOCUMENTS

| | | | | |
|---|---|---|---|---|
| 6,660,059 | B2 * | 12/2003 | Ji et al. | 75/744 |
| 7,544,232 | B2 * | 6/2009 | Hackl et al. | 75/744 |
| 2007/0137437 | A1 * | 6/2007 | Choi et al. | 75/741 |
| 2010/0242681 | A1 | 9/2010 | Nagase et al. | |

FOREIGN PATENT DOCUMENTS

| | | | |
|---|---|---|---|
| EP | 316094 | A * | 5/1989 |
| EP | 0316094 | A2 | 5/1989 |
| JP | 1-156432 | A | 6/1989 |
| JP | 2002-53310 | A | 2/2002 |
| JP | 2006-57133 | A | 3/2006 |
| JP | 2010-180450 | A | 8/2010 |
| JP | 2010-235999 | A | 10/2010 |
| WO | WO 2004/005556 | A1 | 1/2004 |

OTHER PUBLICATIONS

Australian Official Action, dated Feb. 27, 2013, for Australian Application No. 2012203072.
Office Action for Japanese Application No. 2011-121104, dated May 14, 2013.

* cited by examiner

Primary Examiner — George Wyszomierski
Assistant Examiner — Tima M McGuthry Banks
(74) Attorney, Agent, or Firm — Birch, Stewart, Kolasch & Birch, LLP

(57) ABSTRACT

A process of leaching gold can be inexpensively and efficiently carried out from a mixture containing sulfur and gold, typically from the material containing sulfur and gold that is an intermediate product recovered by the flotation method in the hydrometallurgical method. Specifically, the mixture containing elemental sulfur and gold and an aqueous solution of hydroxide of one or more of metals of alkali metals and alkaline earth metals are combined, the hydroxides reacting with elemental sulfur to form thiosulfate of alkali and/or alkaline earth metal, and the gold thereby being leached by reaction with the thiosulfate.

8 Claims, 2 Drawing Sheets

Flow of leaching gold in the floats

Flow of leaching gold in the floats

Effects of temperature and time on the leach rate of gold

PROCESS OF LEACHING GOLD

FIELD OF THE INVENTION

The present invention relates to a process of leaching gold out of post-leaching residue of sulfide ores, particularly it provides a process of leaching gold efficiently from the gold-containing substance mainly constituted of elemental sulfur (hereafter, referred to "sulfur" unless otherwise defined) recovered by a flotation of the post-leaching residues, which is obtained by a hydrometallurgical process of leaching metal other than gold (defined as objective metal) from ores and concentrates containing gold and sulfide of objective metal.

BACKGROUND OF THE INVENTION

Sulfur which was in the fog in of sulfide by combining with the objective metal remains in the post-leaching residue, which was obtained after leaching of objective metal in the hydrometallurgical process for sulfide ores.

The flotation method is a method for separating and recovering the objective substance by adhering it onto the surface of air bubbles by utilizing the differences of the hydrophilicity and hydrophobicity of the surface of the substances. Since sulfur has hydrophobicity, it can be easily recovered by the flotation method.

For example, Japanese Patent Application Publication No. 2002-53310 (Patent document 1) shows the process for recovering sulfur from the floats in which sulfur has been concentrated by applying the flotation method to the post-leaching residue of zinc concentrate containing sulfur produced in the process of leaching the zinc concentrate.

In case where sulfide ore of the objective metal contains gold, it is difficult to leach gold during the process for leaching the objective metal in an ordinary hydrometallurgical method, and therefore, gold remains in the post-leaching residue together with sulfur which had constituted the sulfide with the objective metal. When the sulfur is recovered by the flotation method, gold also can be recovered together.

For example, Japanese Patent Application Publication No. 2006-57133 (Patent document 2) shows a process wherein the mixture of gold and sulfur recovered by the flotation method is heated to the temperature sufficient for melting of sulfur, and then gold and sulfur are separated by centrifugation.

With regard to the process for treating the gold recovered together with sulfur, a process in which sodium cyanide or sodium thiosulfate is used is generally known as a process for leaching gold. However, cyan has toxicity, and therefore, the safety of waste liquid treatment and environmental burden are problematic. When sodium thiosulfate is used, leach rate of gold is lower compared to the case where cyan is used, resulting in a higher cost.

Therefore, the patent document 2 shows a process wherein a mixture of gold and sulfur is recovered by a flotation, and the sulfur is then separated from the mixture by melting and centrifugation, and is subsequently treated with a pyrometallurgical method. However, a special device is required for performing the centrifugation under heating. Even using the pyrometallurgical method, there is a problem that the environmental burden becomes heavier due to the remaining sulfur.

In Japanese Patent Application Publication No. 2010-180450 (Patent document 3), though no concrete method to remove sulfur is shown, it discloses a process wherein sulfur is removed from the mixture of gold and sulfur recovered by the flotation method and then oxidizing roasting is performed, and further, the product of oxidizing roasting is dissolved in a sulfuric acid solution for separating and recovering contained gold residue. Also in this process, a dry process of oxidizing roasting is necessary.

However, if gold can be leached safely and efficiently from the recovered material from the flotation method, which is an intermediate product containing sulfur and gold obtained by the hydrometallurgical method, it is possible to make the whole process more compact by employing the hydrometallurgical method.

PRIOR ART DOCUMENTS

Patent Documents

[Patent document 1] Japanese Patent Appln Publication No. 2002-53310
[Patent document 2] Japanese Patent Appln Publication No. 2006-57133
[Patent document 3] Japanese Patent Appln Publication No. 2010-180450

SUMMARY OF INVENTION

In view of above-mentioned problems of the prior art, the object of the present invention is to provide a process of leaching gold that can be inexpensively and efficiently carried out without using cyan from the mixture containing sulfur and gold, typically from the material which contains sulfur and gold and is an intermediate product recovered by the flotation method in the hydrometallurgical method.

In order to achieve the above-described object, the present inventors have eagerly studied.

It was confirmed that sulfur in the material recovered by the flotation method is changed, through the reaction with caustic soda, into aqueous sodium thiosulfate which can be solubilized and removed.

Further, sodium thiosulfate, which has the action of leaching gold, is produced by a reaction between caustic soda and sulfur in the recovered material by the flotation method, and thus, gold is leached. At this step, the leach rate is increased by heating and/or introducing an oxygen-containing gas.

Using caustic soda makes it possible to reduce the cost for chemicals to about $2/5$ compared to the case where sodium thiosulfate is used.

Further, in leaching gold in the floats by sodium thiosulfate, when the leaching by a reagent and the leaching according to the present invention which is accompanied with dissolution of sulfur was compared, it was revealed that the process according to the present invention was superior to the former in the leach rate.

The inventors of the present application have completed the present invention on the basis of the above-described findings.

The Present invention is defined as follows:

(1) A process of leaching gold from a mixture containing elemental sulfur and gold, comprising contacting said mixture with aqueous solution of hydroxide of one or more of metals selected from the group consisting of alkali metals and alkaline earth metals, and reacting said hydroxide and elemental sulfur so that thiosulfate of corresponding metal is produced, and then leaching gold by the produced thiosulfate.

(2) The process according to (1), wherein the leaching is performed at a temperature of solution of 40° C. or more.

(3) The process according to (1), wherein the leaching is performed at a temperature of solution of 60° C. or more.

(4) The process according to any one of (1)-(3), wherein the leaching is performed while blowing in an oxygen-containing gas.

(5) The process according to any one of (1)-(4), wherein the total amount of hydroxide used is 0.5 equivalent or more against the elemental sulfur.

(6) The process according to any one of (1)-(4), wherein the total amount of hydroxide used is 1.0-2.5 equivalent against the elemental sulfur.

(7) The process according to any one of (1)-(6), wherein said mixture is floats recovered by a flotation method from a post-leaching residue obtained after an objective metal is leached with a hydrometallurgical method from ore or concentrate containing gold and the objective metal.

(8) The process according to any one of (1)-(7), wherein caustic soda is used as hydroxide.

Using the process for leaching gold according to the present invention makes it possible to recover gold from the mixture containing sulfur and gold only by the hydrometallurgical method. For example, the process makes it possible to recover gold, using only the hydrometallurgical method, from the mixture containing sulfur and gold which was recovered by the flotation method from the post-leaching residue obtained after the objective metal is leached by the hydrometallurgical method from ore or concentrate mainly constituted of sulfide which contains gold.

The major effects are summarized as follows:
(1) The process according to the present invention is highly safe since no cyan is used, and therefore, environmental burden is smaller compared to the cyanide process, that is, the prior process for leaching gold.
(2) Removing sulfur by the process of the present invention is easier compared to the process wherein sulfur is separated and removed before gold is recovered by the pyrometallurgical method, and therefore, the present process makes it possible to reduce the time required for obtaining the product gold and the amount of work, economical effect of which is great because gold is expensive.
(3) The present invention is advantageous economically because it is carried out by using inexpensive chemicals. For example, when the prices of chemicals per mole are compared, the price of caustic soda is about ⅕ of sodium thiosulfate, and thus, the cost of chemicals per unit weight of gold can be reduced to about ⅖.
(4) Since sulfur is removed by the reaction with alkali metal hydroxide (ex: caustic soda) in advance, the leach rate becomes higher compared to the case where gold is leached with sodium thiosulfate from the beginning.

MODES FOR CARRYING OUT THE INVENTION

Figure 1:
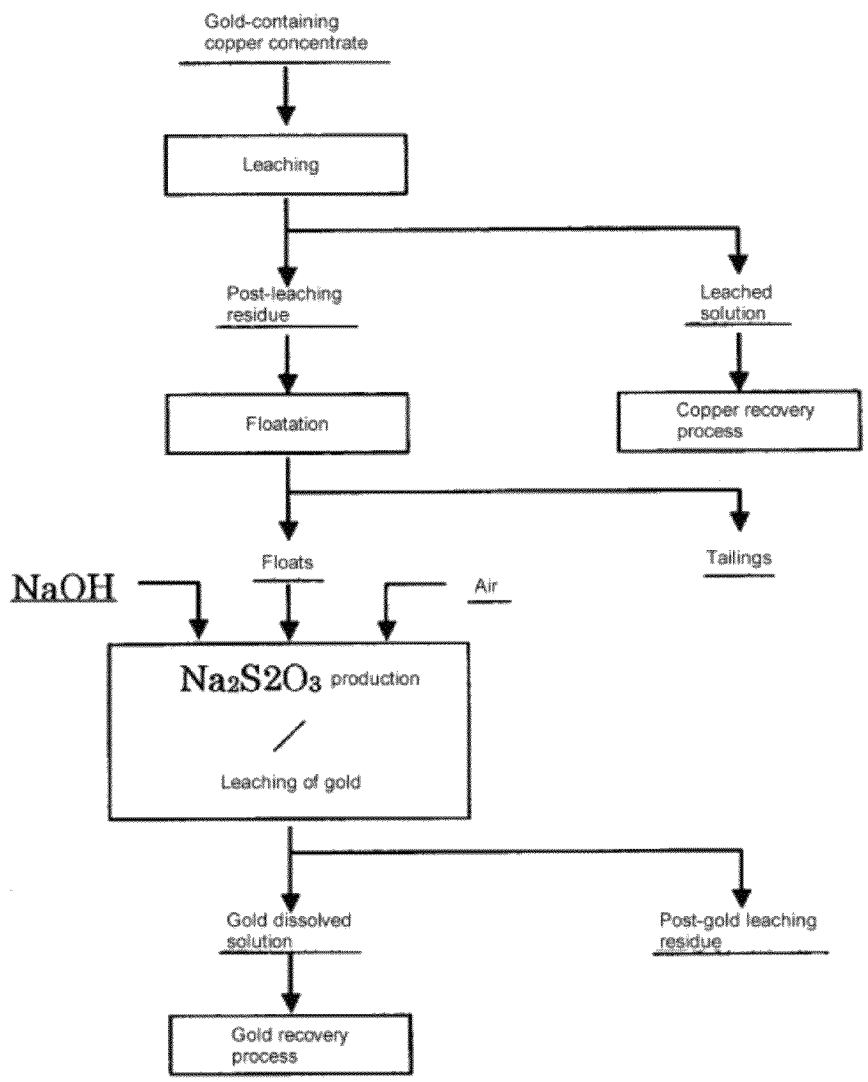
FIG. 1 is a figure showing an example of a flow of process of leaching gold according to the present invention.

The object substance of the present invention is not particularly restricted, as long as it is a mixture containing elemental sulfur and gold. However, typically, it is the floats recovered, by a flotation from the post-leaching residue obtained after hydrometallurgically leaching objective metal from ore or concentrate containing gold and sulfide of objective metal. While the objective metals are not particularly restricted, for example, copper and zinc are mentioned. In the typical embodiment of the present invention, the object substance is the floats recovered by a floatation from the post-leaching residue obtained by hydrometallurgy of copper.

According to the present invention, said mixture is firstly contacted with an aqueous solution of hydroxide of one or more metals selected from the group consisting of alkali metals and alkaline earth metals, and thus, said hydroxide is reacted with sulfur so that thiosulfate of the corresponding metal is produced. By said reaction, an effect that elemental sulfur covering the surface of gold is decreased, and thus, the leach rate of gold will increase is obtained. In addition, since the produced thiosulfate has an action of leaching gold, the leaching of gold can be carried out without adding any other agent for leaching gold.

As for hydroxides of alkali metals, there is not any particular restriction, and therefore, any of caustic soda (sodium hydroxide), potassium hydroxide, rubidium hydroxide, cesium hydroxide, and francium hydroxide can be used. However, among them, caustic soda is preferable on the cost front.

As for hydroxides of alkaline earth metals, there is also no restriction, and therefore, calcium hydroxide, strontium hydroxide, barium hydroxide and radium hydroxide can be used. However, hydrated lime (calcium hydroxide) is preferable because it is easily available. Hydroxides of beryllium and magnesium, which are elements belonging to Group II elements like alkaline earth metals have a very poor water solubility, and therefore, they are not adequate.

On the basis of the leach rate of gold, total amount of hydroxides of alkali metal(s) and alkaline earth metal(s) is preferably 0.5 equivalent or more, more preferably 1.0 equivalent or more, and most preferably 2.0 equivalent or more. However, on the basis of saturation of the leach rate and cost, no excessive amount is required to be added, and thus, practically, the amount is preferably 5.0 equivalent or less, more preferably 3.0 equivalent or less, and yet more preferably 2.5 equivalent or less.

As for the method for contact, there is no particular restriction, and thus, for example, a method wherein the mixture is soaked in said aqueous solution, a method wherein said aqueous solution is sprayed to the mixture, a method wherein said aqueous solution is poured onto the mixture, and the like can be mentioned. On the basis of the efficiency of leaching, the method wherein the mixture is soaked in said aqueous solution is preferable. In order to increase the efficiency of the reaction, the mixture is preferably provided in powdered or granular form. Stirring the mixture is also preferable. Further, it is also preferable to heat the mixture or to blow in an oxygen-containing gas into the mixture.

When the mixture is heated, the temperature of the mixture is preferably 40° C. or more, more preferably 60° C. or more, and yet more preferably 70° C. or more. The temperature is preferably 75-85° C. (e.g., about 80° C.) because too much heating increases energy cost and the amount of evaporation of water is increased.

As for the oxygen-containing gas, pure oxygen, industrial oxygen purified by pressure swing adsorption and the like, air and the like can be mentioned. Air is preferable because of cost/effect tradeoffs.

One embodiment of the process according to the present invention is shown in FIG. 1. Along with the flow sheet, the process is explained below. The process according to the present invention can be preferably applied to the post-leaching residue obtained by the hydrometallurgy of copper as indicated, but is not limited to it.

The post-leaching residue of the gold-containing copper concentrate is separated into the floats and tailings by a floatation. Gold is recovered in the floats together with sulfur. The grade of the floats as the raw material is, for example, 30-55 g of gold/t, 0.3-1.0 mass % of copper, 9.2-14 mass % of iron, and 50-70 mass % of sulfur.

When the floats recovered are soaked in an aqueous solution of caustic soda and stirred, sodium thiosulfate is produced. This reaction is represented by the following formula.

$6NaOH + 6S \rightarrow 2Na_2S_2 + Na_2S_2O_3 + 3H_2O$

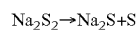

$Na_2S_2 \rightarrow Na_2S + S$

The amount of caustic soda added in this process is typically about 1-1.2 times of stoichiometric amount. In addition, it is considered that blowing oxygen into said reaction will cause oxidation of $Na_2S$ as shown in the following formula, and therefore, sodium thiosulfate will be produced, and thus, the leach rate will further increase, and therefore the efficiency of the reaction will be improved.

$$2Na_2S + 2O_2 + H_2O \rightarrow Na_2S_2O_3 + 2NaOH$$

When further stirring is continued, the reaction of leaching of gold by sodium thiosulfate produced will progress. This reaction is represented by the following formula.

$$Au + 1/2O_2 + 4S_2O_3^{2-} + H_2O \rightarrow 2Au(S_2O_3)_2^{3-} + 2OH^-$$

Further, it is also considered that since said reaction also requires oxygen, the leach rate will increase and the efficiency of the reaction will be thus increased by blowing in oxygen.

A dissolved solution of gold obtained by solid-liquid separation after the reaction of leaching gold is then sent to the process for recovering gold, and it is purified by known means such as activated carbon adsorption, solvent extraction, reduction, cementation, electrolytic refining and the like, and thus, gold product can be obtained. For example, while S value exists in the post-leaching solution in the forms of thiosulfate, sulfide and elemental sulfur and the like, these can be separated from gold by solvent extraction.

EXAMPLE

While the present invention will be further explained below in detail, the present invention is not limited by these examples at all.

The method for analyzing metals used in examples was carried out by ICP Emission Spectroscopy. In the analysis of gold, gold was separated out by cupellation and then quantitative analysis was performed by ICP Emission Spectroscopy.

Example 1

Effects of Temperature and Time on the Rate of Leaching Gold

The post-leaching residue obtained after copper was leached with sulfuric acid from copper concentrate was separated, by a floatation, into the floats and tailings. The grade of the floats thus obtained was 45.1 g of gold/t, 0.6 mass % of copper, 14 mass % of iron, and 62 mass % of sulfur.

75 g of said floats were projected into an aqueous solution of caustic soda of 2.8 mol/L so that the pulp concentration would be 70 g/L, and thus, Au was leached by the produced sodium thiosulfate in each condition described in Table 1. In this case, the amount of caustic soda added is 2 equivalent.

Figure 2:
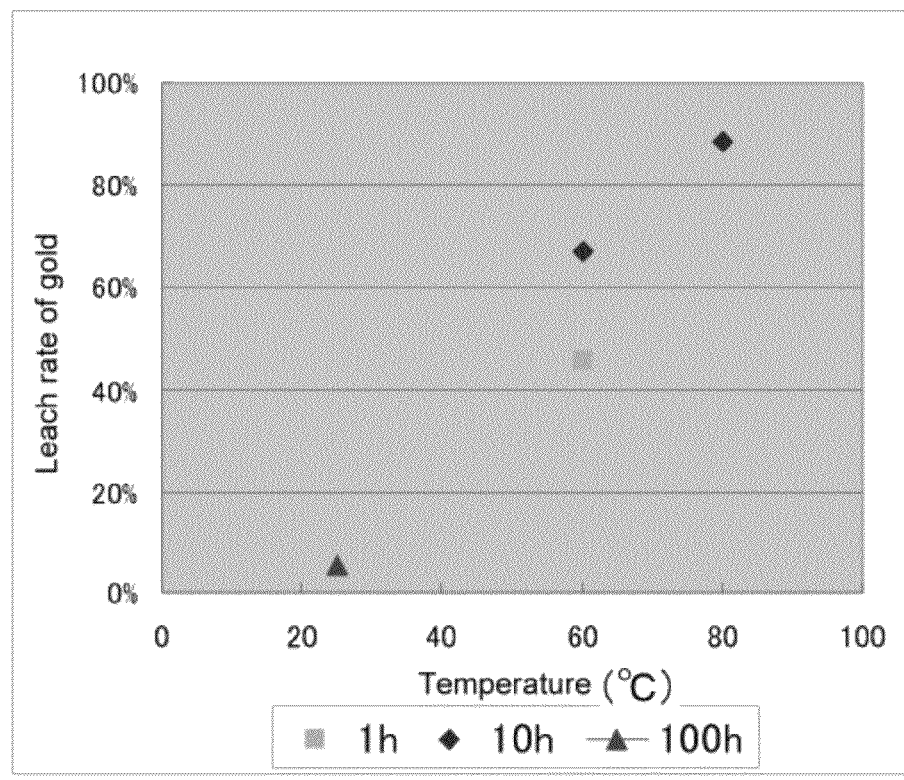
FIG. 2 is a figure showing the effects of temperature and time on the leaching of gold from the floats mainly constituted of sulfur recovered by a flotation in Example 1.

As the result, while the leach rate of gold for 100 hours was 6% at 25° C., the reaction being promoted by increasing the temperature. At 40° C., the leach rate was 28% for 1 hour, and was 49% for 10 hours. At 60° C., the leach rate was 46% for 1 hour and was 67% for 10 hours. Further, when the temperature was 80° C., the leach rate of gold reached 89% for 10 hours. These results are shown in Table 1 and FIG. 2.

The leach rate of gold was determined by calculating the amount distributed into the aqueous solution based on the weight and grade of the floats and post-leaching residue, provided that the weight of gold in the float is 100%.

At 25° C., the leach rate of sulfur for 100 hours was 98%. The reaction was promoted by increasing temperature, and thus, at 60° C., the leach rate was 98% for 1 hour and was 99% for 10 hours. At 80° C., the leach rate was 88% for 10 hours. The reason why the leach rate of sulfur at 80° C. is lower than that at 60° C. is assumed that elemental sulfur was produced by the degradation of thiosulfate.

Example 2

Effects of Blowing in Air 75 g of the same floats as used in Example 1 was projected into 2.8 mol/L caustic soda solution so that the pulp concentration would be 70 g/L, and then Au was leached by the produced sodium thiosulfate produced at a solution temperature of 60° C., with air being blown into the solution at the rate of 1.0 L/min for 1 hour. The result is shown in Table 1. In this case, the leach rate was 56%, which was improved by 10% or more compared to the case where air was not blown.

Comparative Example 1

Effect of Removing Sulfur on Leaching Gold

The leach rate of gold was examined by performing the leaching of gold with sodium thiosulfate on the raw material floats in a similar manner.

The grade of the raw material floats was 45.1 g of gold/t, 0.6 mass % of copper, 14 mass % of iron, and 62 mass % of sulfur.

75 g of said floats was projected into 0.5 mol/L of an aqueous solution of sodium thiosulfate so that the pulp concentration would be 70 g/L, and thus, Au was leached.

The condition for leaching was the same condition as in Example 1 which achieved the maximum leach rate, namely, the temperature of the solution being 80° C. and the reaction time being 10 hours. Using sodium carbonate, pH was adjusted to 10. During the test, pH was constant. In this case, the leach rate was 10% for 1 hour, and was 14% for 10 hours. These are remarkably lower values compared to Example 1.

It is considered this is because removal of sulfur was performed at the same time as gold was leached in Example 1, and therefore, covering of gold by sulfur and disturbance against the leaching by hydrophobicity was avoided.

Accordingly, it is clear that the process according to the present invention for leaching gold from the material containing sulfur and gold which is recovered by the floatation from the post-leaching residue obtained through the hydrometallurgical process, is preferable as a process for leaching without using cyan.

TABLE 1

| Leaching solution | Leach rate | Leaching time | 25° C. | 40° C. | 60° C. | 60° C. Blowing of air yes | 80° C. | Remarks |
|---|---|---|---|---|---|---|---|---|
| | | | no | no | no | yes | no | |
| Aqueous solution of caustic soda | Leach rate of Au | 1 hour | — | 28% | 46% | 56% | — | Examples (1-2) |
| | | 5 hours | — | 48% | — | — | — | |
| | | 10 hours | — | 49% | 67% | — | 89% | |
| | | 100 hours | 6% | — | — | — | — | |
| | Leach rate of sulfur | 1 hour | — | 85% | 98% | — | — | |
| | | 5 hours | — | 99% | — | — | — | |
| | | 10 hours | — | 98% | 99% | — | 88% | |
| | | 100 hours | 98% | — | — | — | — | |

TABLE 1-continued

| Leaching solution | Leach rate | Leaching time | Temperature of the solution | | | | | Remarks |
|---|---|---|---|---|---|---|---|---|
| | | | 25° C. | 40° C. | 60° C. | 80° C. | | |
| | | | Blowing of air | | | | | |
| | | | no | no | no | yes | no | |
| Aqueous sol. of sodium thiosulfate | Leach rate of Au | 1 hour | — | — | — | — | 10% | Comp. Example (1) |
| | | 10 hours | — | — | — | — | 14% | |

Example 3

Effect of the Amount of Caustic Soda on the Leach Rate of Gold 150 g of the same floats as used in Example 1 was projected into the caustic soda solution such that the concentration of pulp would be 70 g/L. The concentration of caustic soda was adjusted to have the value of equivalent against sulfur as described in Table 2. Then, under the conditions described in Table 2, without blowing in air, Au was leached with sodium thiosulfate produced, leaching time being 10 hours. The results are shown in Table 2. It can be seen that the leach rate of Au increases according to the increase in the equivalent of caustic soda against sulfur.

TABLE 2

| Leaching solution | Leach rate | Temp. of sol.(° C.) | Equivalent of NaOH (to sulfur) | | |
|---|---|---|---|---|---|
| | | | 0.5 | 1 | 2 |
| Aqueous sol. of caustic soda | Leach rate of Au | 60 | 55% | 58% | 67% (Example 1) |
| | | 80 | 50% | 70% | 89% (Example 1) |
| | Leach rate of sulfur | 60 | 98% | 99% | 99% (Example 1) |
| | | 80 | 98% | 99% | 88% (Example 1) |

What is claimed is:

1. A process of leaching gold from a copper concentrate comprising a mixture containing elemental sulfur and gold, which comprises:
   preparing said mixture in which the elemental sulfur covers the surface of the gold;
   contacting said mixture with an aqueous solution of one or more metal hydroxide, wherein said one or more metal is one or more metal selected from the group consisting of an alkali metal and an alkaline earth metal,
   reacting said one or more metal hydroxide and elemental sulfur to produce one or more metal thiosulfate, and
   leaching gold by the produced one or more metal thiosulfate;
   wherein said mixture is obtained from said copper concentrate.

2. The process according to claim 1, wherein the leaching is performed at a temperature of solution of 40° C. or more.

3. The process according to claim 1, wherein the leaching is performed at a temperature of solution of 60° C. or more.

4. The process according to claim 1, wherein the leaching is performed while blowing in an oxygen-containing gas.

5. The process according to claim 1, wherein the total amount of hydroxide used is 0.5 molar equivalent or more against the elemental sulfur.

6. The process according to claim 1, wherein the total amount of hydroxide used is 1.0-2.5 molar equivalent against the elemental sulfur.

7. The process according to claim 1, wherein said mixture is a floats fraction recovered by a flotation method from a post-leaching residue obtained after an objective metal is leached with a hydrometallurgical method from the copper concentrate containing gold and the objective metal, wherein said floats fraction comprising a substance adhering on a surface of bubbles in said flotation method.

8. The process according to claim 1, wherein caustic soda is used as hydroxide.

* * * * *